July 7, 1964  J. A. RIVERA  3,139,919
COMBINATION COFFEE PULPER, WASHING AND SELECTING MACHINE
Filed Aug. 3, 1961  7 Sheets-Sheet 1

Juan A. Rivera
INVENTOR.

July 7, 1964 J. A. RIVERA 3,139,919
COMBINATION COFFEE PULPER, WASHING AND SELECTING MACHINE
Filed Aug. 3, 1961 7 Sheets-Sheet 3

Juan A. Rivera
INVENTOR.

July 7, 1964 J. A. RIVERA 3,139,919
COMBINATION COFFEE PULPER, WASHING AND SELECTING MACHINE
Filed Aug. 3, 1961 7 Sheets-Sheet 4

Juan A. Rivera
INVENTOR.

BY *Clarence A. O'Brien*
*and Harvey B. Jackson*
Attorneys

July 7, 1964 J. A. RIVERA 3,139,919
COMBINATION COFFEE PULPER, WASHING AND SELECTING MACHINE
Filed Aug. 3, 1961 7 Sheets-Sheet 5

Juan A. Rivera
INVENTOR.

July 7, 1964   J. A. RIVERA   3,139,919
COMBINATION COFFEE PULPER, WASHING AND SELECTING MACHINE
Filed Aug. 3, 1961   7 Sheets-Sheet 6

Juan A. Rivera
INVENTOR.

BY Clarence A. O'Brien
and Harvey B. Jacobson
Attorneys

United States Patent Office 3,139,919
Patented July 7, 1964

3,139,919
COMBINATION COFFEE PULPER, WASHING AND SELECTING MACHINE
Juan A. Rivera, P.O. Box 1269, Bayamon, Puerto Rico
Filed Aug. 3, 1961, Ser. No. 129,164
19 Claims. (Cl. 146—280)

This invention relates to a complete crop processing machine restrictively removing the pulp casing only from coffee grains that have been properly ripened, washing the lubricant coated coffee beans separated from the ripe grains upon removal of the pulp casing and separating the washed coffee beans from the other coffee grains.

After harvesting a coffee crop, considerable time and effort is involved in processing the coffee grains before the harvest is in condition for use. Accordingly, it is necessary first to separate out the crop those coffee grains which have been properly ripened. Secondly, the pulp casing of each ripened coffee berry must be removed in order to expose the coffee beans therewithin. Thereafter, the coffee beans must be thoroughly washed for removal of a mucous-like substance that coats the beans. Machines have heretofore been proposed for removing the pulp from the coffee grain as well as to wash the coffee beans released as a result thereto. Most coffee pulper machines heretofore used for the purpose of removing the pulp from the coffee berries, involve the grinding away of the pulp casing by subjecting the coffee grains to the action of a moving rasping surface. Considerable damage to some coffee grains however has resulted because of excess grinding and because of the inability of prior machines to automatically accommodate itself to size variations in the coffee grains or otherwise regulate the de-pulping action of the mechanical parts of the machine. Furthermore, a considerable amount of prior coffee grain selection was heretofore required so as to enable the coffee crop supplied to the machine to be de-pulped with any degree of success. It is therefore a primary object of the present invention to provide a coffee processing machine which will completely process a coffee crop and without any damage to coffee grains.

Another object of this invention is to provide a coffee crop processing machine which features a novel pulping mechanism effective to de-pulp only ripe coffee berries and yet pass other coffee grains without damage thereto.

A further object of this invention is to provide a coffee crop processing machine which does not require prior selection of coffee grains for feeding to the machine but which will receive the entire coffee crop processing only the ripe coffee grains while delivering the remainder of the crop without damage thereto for additional drying. Loss of a portion of the coffee crop is thereby avoided.

An additional object of this invention is to provide a combination coffee processing machine featuring a washer mechanism effective to remove the coating substance on the coffee beans without use of chemical compounds and within a short period of time.

In accordance with the foregoing objects, the machine of the present invention features an inlet mechanism adapted to receive an entire coffee crop including coffee grains that are ripe, green and in varying sizes and physical conditions. The inlet feed mechanism is therefore operative to control the rate of feed of the coffee grain into a pulping or hulling mechanism as well as to bar all granular matter which exceeds a predetermined maximum grain size. The pulping mechanism involves a plurality of rotating rasping disks between which yieldably movable confining members are disposed for confining movement of the coffee grain with respect to the rotating rasping disks which are thereby effective to grind away the pulp from ripe coffee berries. The confining members are also provided with channel grooves which receive the granular materials after it has been subjected to a predetermined amount of pulping action by the pulping disk. Accordingly, the channel grooves within the confining members provide an escape for granular materials below the predetermined minimum size above which the rasping disk is operative thereon. As a result thereof, the coffee beans that are released as a result of the pulp removal action and also other coffee grains including the small green coffee grains that have not been subjected to pulp removal action, are delivered to a washer without damage to any portion of the granular materials that has passed through the pulping mechanism. The washer subjects the granular material to the cleaning action of an agitator rotor through which rinsing sprays are discharged. As a result thereof the mucous-like coating about the coffee beans is washed away. Impeller blades mounted on the agitator rotor control the rate of movement of the granular materials through the washing process for discharge through a gate biased closed with a pressure that also controllably regulates the feed rate through the washer mechanism. Finally, the washed materials are delivered to a separating mechanism for the purpose of removing only the de-pulped and washed coffee beans from the remainder of the granular material, the residue of which is delivered without damage for further processing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
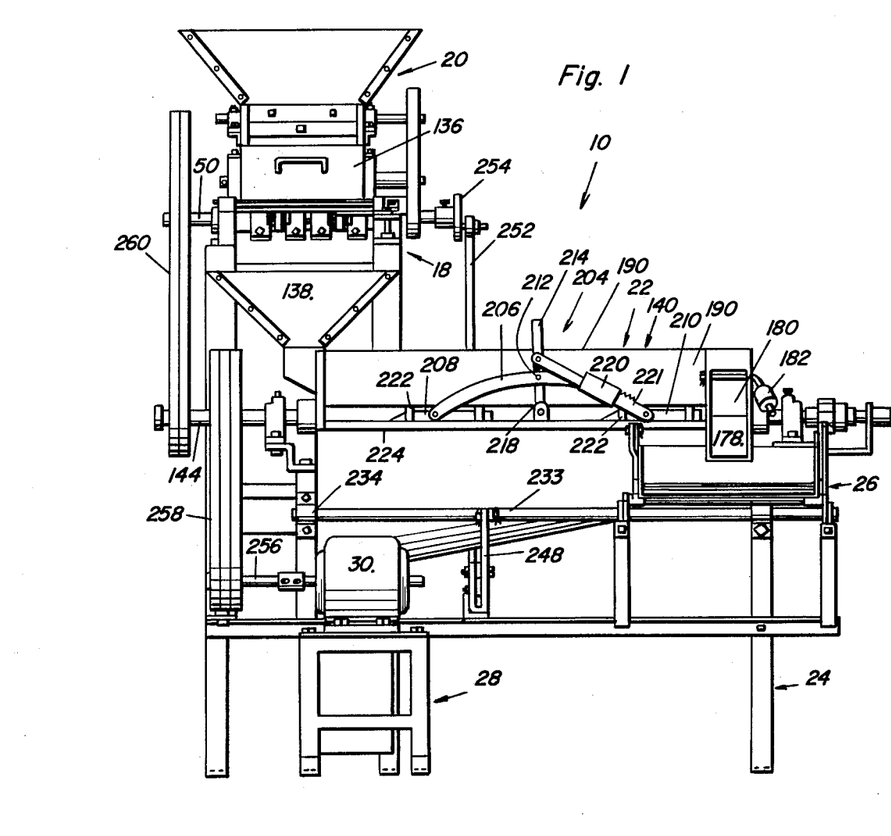
FIGURE 1 is a front elevational view of the coffee crop processing machine of the present invention.
Figures 2, 12:
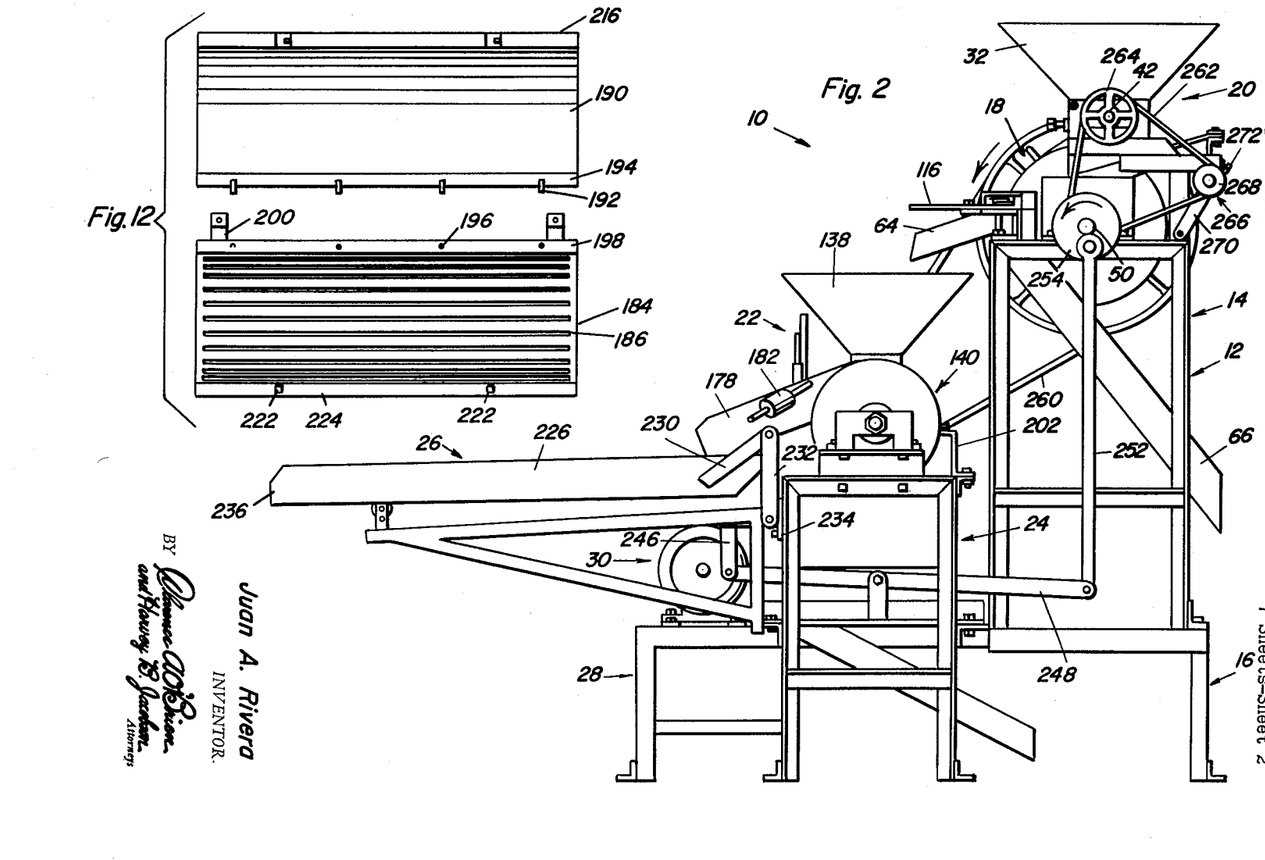
FIGURE 2 is a side elevational view of the coffee processing machine.
FIGURE 12 is a top plan view of the washer cylinder halves disassembled from each other.
Figures 3, 15:
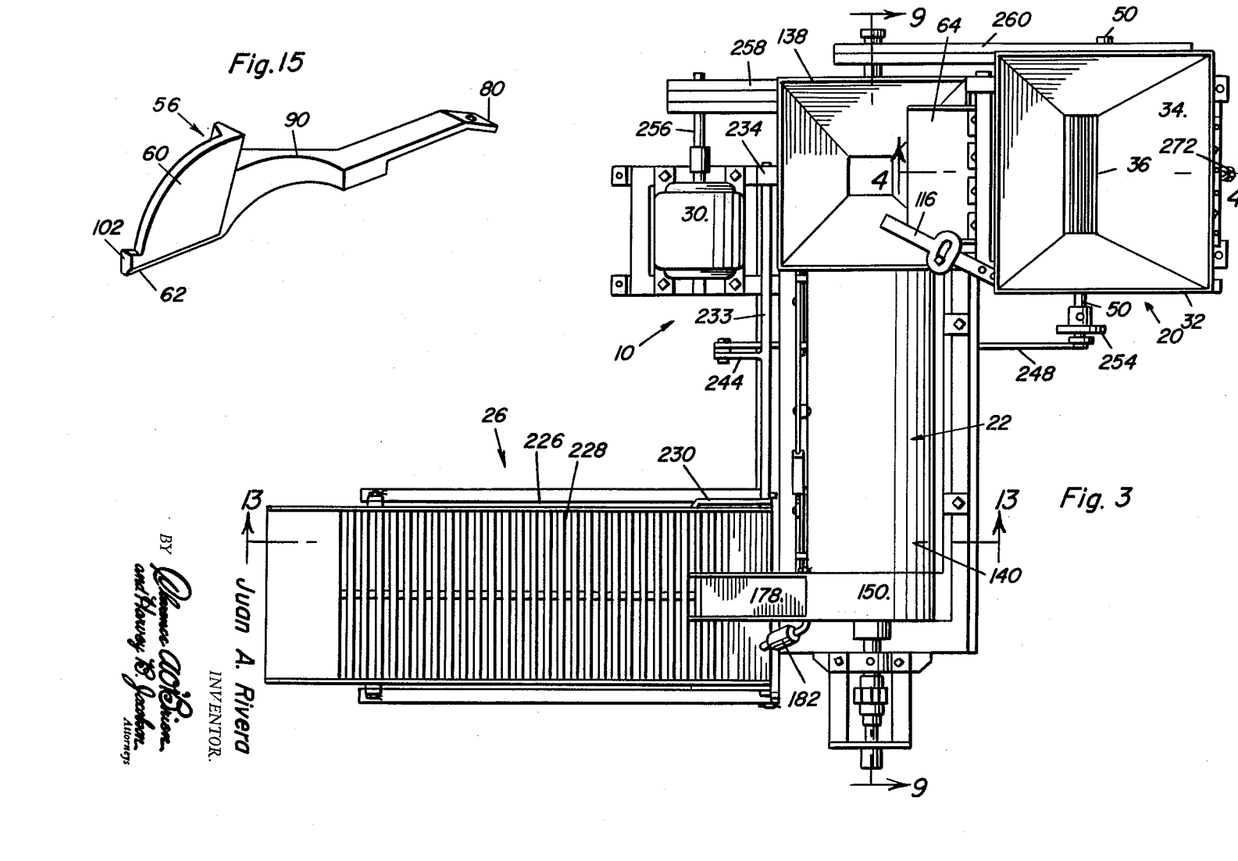
FIGURE 3 is a top plan view of the machine.
FIGURE 15 is a perspective view of one confining member element of the pulping mechanism.

The coffee crop processing machine of the present invention is generally referred to by reference numeral 10 as completely illustrated in FIGURES 1, 2 and 3. Referring however to FIGURE 2 in particular, it will be observed that the machine 10 includes a plurality of components supported by a frame structure referred to by reference numeral 12. The frame structure 12 includes a frame sub-assembly portion 14 mounted on a base portion 16. The frame portion 14 mounts thereabove, the pulping mechanism 18 which receives the coffee crop material from an inlet feeding mechanism generally referred to by reference numeral 20 disposed above the pulping mechanism 18. The coffee material is delivered from the pulping mechanism 18 to a washing device generally referred to by reference numeral 22 which is mounted above a frame portion 24. Also detachably mounted on the frame portion 24 and extending forwardly therefrom, is a separating mechanism generally referred to by reference numeral 26. A power base portion 28 is also secured to the frame structure for adjustably mounting thereon an electric motor 30 as the power source for the machine. The motor 30 is accordingly drivingly connected to the aforementioned components of the machine 10 for operation thereof.

Figure 4:
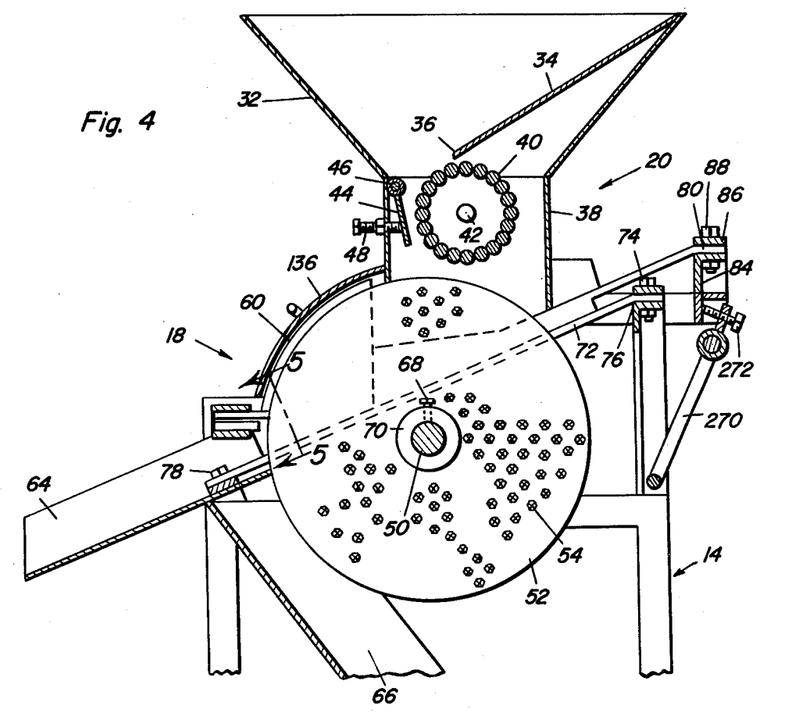
FIGURE 4 is an enlarged partial sectional view taken substantially through a plane indicated by section line 4—4 in FIGURE 3.

Referring now to FIGURES 3 and 4 in particular, it will be observed that the inlet feeding mechanism 20 includes an inlet hopper member 32 into which the coffee crop is loaded. Mounted within the hopper 32 is a downwardly inclined guide plate 34 terminating at a lower end 36 to form a restricted outlet at the bottom of the hopper member 32. The hopper 32 is therefore connected to a tubular member 38 that rotatably mounts therewithin a feeder rotor 40 fixed to a feeder shaft 42 journalled in the tubular member 38 and operative to rotate the feeder rotor 40 in a counterclockwise direction as viewed in FIGURE 4. The surface of the feeder rotor 40 is exposed to the restricted outlet formed at the lower edge of the guide plate 34 and forms a further restricted passage with the gate member 44 pivotally mounted by pin 46 at the upper end of the tubular member 38. An adjustable stop element 48 is therefore threadedly mounted within the wall of the tubular member 38 for regulating the position of the passage restricting gate 44 to thereby regulate the size of the restricted passage to bar passage to all materials which exceed an adjusted predetermined size. It will therefore be apparent, that the passage restricting feed gate 44 may be adjusted in accordance with the maximum size of coffee grain deemed to be ripe so that all larger particles that may cause damage to the machine will stop rotation of the rotor 40 having therefor a belt drive capable of slipping when overloaded as hereafter described. Accordingly, granular material will be fed past the gate 44 at a rate controlled by the rotational speed of the feeder rotor 40 and will include in addition to ripe coffee berries, green coffee berries of necessarily smaller size. The coffee crop so admitted from the inlet feed mechanism 20 enters the pulping mechanism 18.

With continuing reference to FIGURE 4, it will be observed that the granular material passes from the tubular member 38 downwardly for passage between a plurality of pulping disks that are rotated in a counterclockwise direction as viewed in FIGURE 4 by being secured to the pulper shaft 50. The pulping disks referred to by reference numerals 52 have mounted on both sides thereof, a plurality of rasping projections 54 whereby the pulp is removed from ripe coffee berries which move between each side of a pulper disk and confining members 56 and 58 disposed on opposite sides thereof as more clearly seen in FIGURE 5. The coffee berries are thereby propelled in a counterclockwise direction with respect to the confining members by rotation of the pulper disk. Pulp is therefore removed as the berries are moved past an arcuate portion 60 of the confining members and finally are received within longitudinal channel formations 62 in the confining members for delivery into a coffee grain discharge chute 64. The pulp removed as a result of the rasping action to which the coffee grains have been subjected, passes downwardly from the rotating pulper disks 52 into the pulp discharge chute 66.

Figure 5:
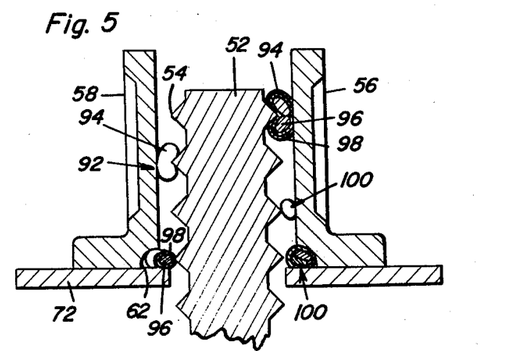
FIGURE 5 is an enlarged partial sectional view taken substantially through a plane indicated by section line 5—5 in FIGURE 4.
Figure 6:
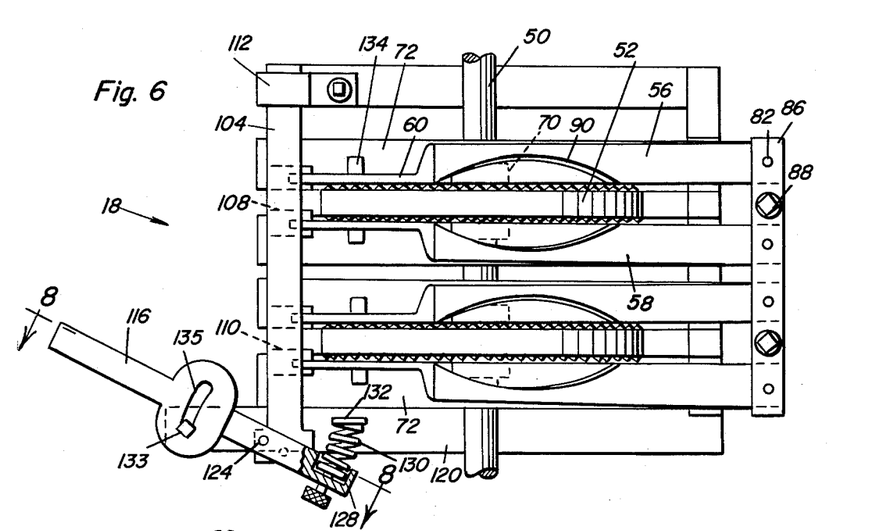
FIGURE 6 is an enlarged partial top plan view of the pulping mechanism removed from the machine illustrated in FIGURES 1 through 3.
Figure 7:
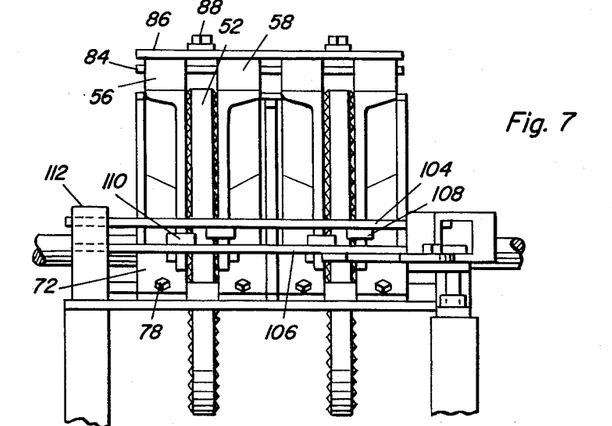
FIGURE 7 is a partial front elevational view of the pulping mechanism illustrated in FIGURE 6.

Referring now to FIGURES 6, 7 and 15, it will be observed that each of the pulper disks 52 is positioned in fixed axially spaced relation to each other by means of setscrews 68 securing the hub portions 70 of the pulper disks 52 to the pulper shaft 50. Spaced on opposite sides of each of the pulper disk 52 just clearing the rasping projections 54, are downwardly inclined support members 72 fixedly bolted at their upper ends by bolts 74 to a horizontally supported frame member 76 as more clearly seen in FIGURE 4. The lower end of the support members 72 are also securely bolted in place by bolts 78. Disposed above the support members 72 and also spaced on either side of the pulper disk 52 at the same downwardly inclined angle as the support member 72, are the confining members 56 and 58. A pair of confining members is therefore associated with each pulper disk. The confining members are however not fixedly spaced as is the case with the support members 72. Accordingly, the upper end portions 80 of each confining member is pivotally mounted by a pin 82 disposed between an angle frame member 84 and an assembly plate member 86 bolted thereto by bolts 88 as more clearly seen in FIGURES 4 and 6. It will therefore be apparent, that the pivotally mounted confining members 56 and 58 may swing toward and away from the rasping projections 54 on the pulper disk. For that reason, the arcuate portion 60 of the confining members are disposed at the ends thereof remote from the pivot pins 82 whereby only slight angular displacement of the confining members about the pivot pin mounting 82 results in a more substantial variation in the spacing between the portion 60 and the pulper disk. Each of the confining members is therefore further provided with a depressed side portion 90 in order to gradually bring the coffee grains into pressure contact with the rasping projections 54 adjacent the lower inclined ends of the confining members by wedging of the coffee grains between the arcuate portions 60 and the rotating pulper disk. The spacing between the confining members and the pulper disk is so regulated that the pulp is completely removed only from ripe coffee berries 92 as seen in FIGURE 5 having an outer pulp casing 94. Removal of the casing 94 will therefore free coffee beans 96 which have a lubricating coating 98 thereabout permitting the beams to freely move between the confining members and the pulper disk without damage thereto. Removal of the pulp casing from green coffee beans 100 is however not effected by virtue of the smaller size of such grains. Accordingly, the separated coffee beans 96 and the smaller green coffee grains 100 are finally received within the channel formation 62 in the confining members and passed downwardly therethrough on top of the supporting members 72 into the grain delivery chute 64.

Figure 8:
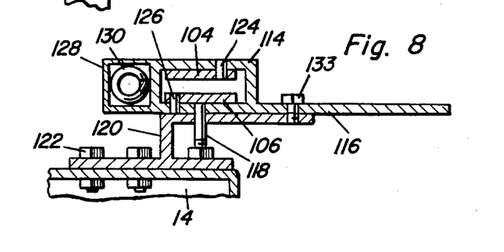
FIGURE 8 is a partial sectional view taken substantially through a plane indicated by section line 8—8 in FIGURE 6.

Regulation of the spacing is effected by connecting the ends 102 of the confining members 58 to a slidably mounted upper control bar 104 while the lower end 102 of the confining members 56 are connected to a lower slidable control bar 106. Accordingly, the upper control bar 104 has fixedly mounted thereon in fixed spaced relation to each other slotted elements 108 that slidably receive the lower ends 102 of the confining members 58. Similarly, the lower control bar 106 mounts in fixed spaced relation to each other the slotted elements 110 for slidably receiving the lower ends 102 of the confining members 56. The control bar members 104 and 106 are therefore slidably mounted at one end by the slide bracket member 112, fixed to the frame structure. The other ends of the control bar members 104 and 106 are enlarged and are received within a tubular portion 114 of a lever member 116 as more clearly seen in FIGURE 8. The lever member is pivotally mounted by a stud pin 118 fixed to a mounting bracket 120 bolted by bolts 122 to the frame portion 14. The control bar members 104 and 106 are pivotally connected to the lever member 116 within the tubular portion 114 on opposite sides of the pivot pin 118 by means of pins 124 and 126. It will therefore be apparent, that upon pivotal displacement of the lever member 116 with respect to its pivot pin 118, sliding movement will be simultaneously imparted to the control bars 104 and 106 in opposite directions. Inasmuch as the control bars 104 and 106 are slidably connected to confining members on opposite sides of the pulper disk, pivotal displacement of the lever member 116 will simultaneously move the confining members in opposite directions either away from or toward the pulper disks. One end 128 of the lever member 116 is therefore recessed for receiving one end of the spring element 130, the other end of which reacts against an abutment 132 on the fixed bracket member 120. The lever member is therefore biased in a direction to yieldably urge the confining members toward the pulper disk. Pivotal displacement of the lever member is however limited by means of a stop element 133 fixed to the frame member 120 and received within an arcuate slot 135 formed within the lever member 116. In order to guide movement of the confining members above the supporting members 72, laterally extending tabs 134 are provided on the confining members. From the foregoing, it will be apparent, that the spacing between the confining members and the pulper disks will be determined by the position of the limit stop 133 and slot 135 on the lever member, the tensioning of the spring element 130 and the size and resistance of the granular materials which become wedged between the rotating pulper disk and the portions 60 of the confining members. Accordingly, by virtue of the regulation in size of the granular materials effected by the inlet feeding mechanism 20 as hereinbefore mentioned, and by proper selection of the spring tension of the spring element 130 and the position of the limit stop 133, the spacing between the confining members and rotating pulper disks may be so regulated as to control the extent of rasping action to which the coffee grains are subjected and hence the pulp removal action of the pulping mechanism 18. It is further significant, that the extent of pulp removal action of the pulping mechanism will be further limited by proper selection of the angular extent of the sector 60 of the confining members and the speed of the pulper disk by means of which the intervals of rasping is determined before the coffee grains are received within the channel formation 62 for delivery to the discharge chute 64. A shield member 136 is therefore provided in protective relation to the arcuate portion 60 of the confining members preventing escape of coffee grains from the pulping mechanism 18, as more clearly seen in FIGURE 4.

Figure 11:
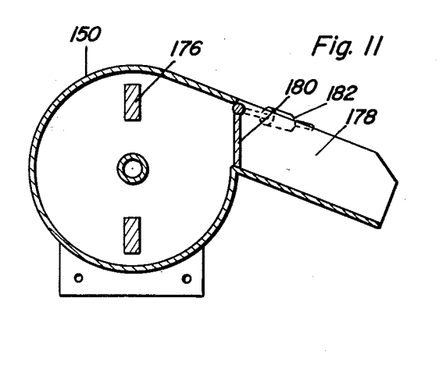
FIGURE 11 is a partial sectional view taken substantially through a plane indicated by section line 11—11 in FIGURE 9.
Figure 13:
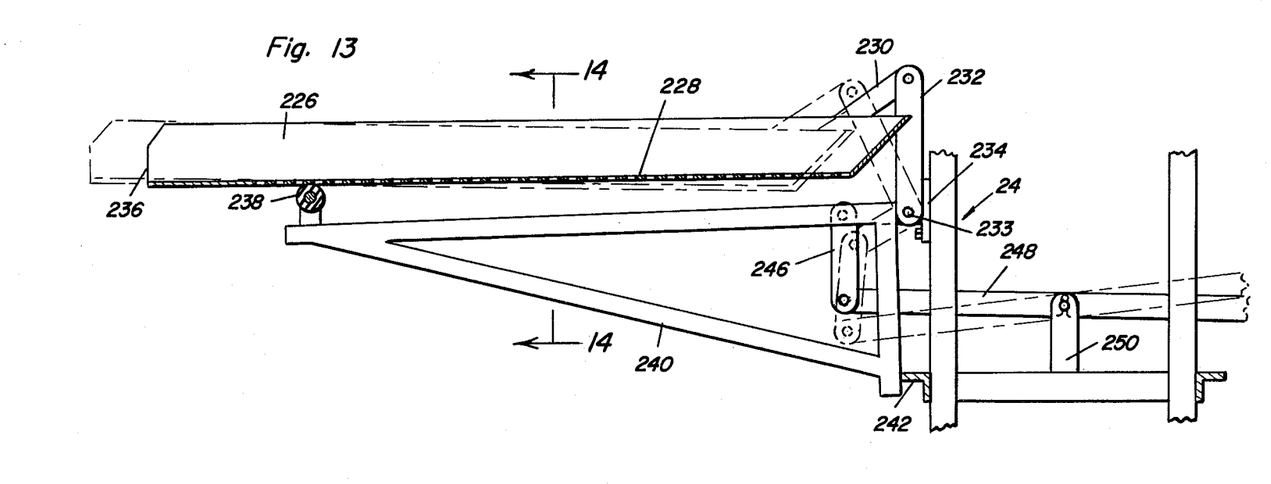
FIGURE 13 is an enlarged partial sectional view taken substantially through a plane indicated by section line 13—13 in FIGURE 3 showing the separating mechanism.
Figure 14:
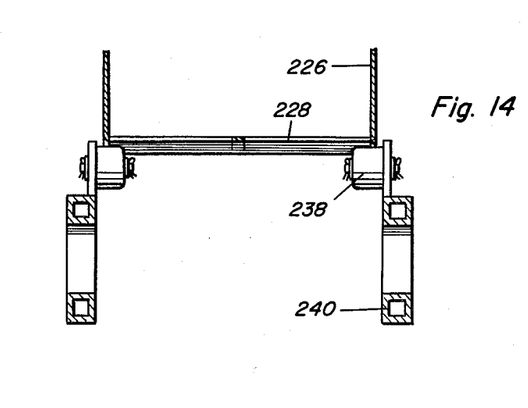
FIGURE 14 is a sectional view taken substantially through a plane indicated by section line 14—14 in FIGURE 13.

Coated coffee beans as well as other coffee grains which are either partially de-pulped or not effected at all within the pulping mechanism are delivered to the inlet hopper 138 of the washing mechanism 22, from the discharge chute 64 of the pulping mechanism 18. The inlet hopper 138 is connected to one axial end of a washing cylinder 140 as more clearly seen in FIGURE 9. The washer cylinder 140 rotatably mounts therewithin an agitator rotor generally referred to by reference numeral 142. The rotor 142 is therefore composed of a tubular shaft member 144 journalled within a sealed bearing member 146 mounted by the frame portion 24 adjacent the inlet end of the washer cylinder 140 while a sealed bearing member 148 journals the tubular shaft member 144 as it passes through a discharge casing member 150. The frame portion 24 therefore supports at the discharge end of the washer a supporting bracket assembly 152 which mounts a fixed conduit section 154 connected by a sealing joint assembly 156 to the rotating tubular shaft member 144. A removable cap element 158 removed for passage cleaning purposes, closes the power end of the tubular shaft member 144 to which the pulley wheels 160 and 162 are connected for imparting rotational movement to the tubular shaft 144. The other end of the tubular shaft member 144 is therefore connected by the sealing joint assembly 156 to the fixed conduit section 154 to which water under pressure is admitted. Spaced apertures 164 are therefore provided in the tubular shaft member 144 within the washing cylinder 140 so that water may be discharged in spray form therefrom for rinsing the coffee grains fed into the washing cylinder from the hopper 138. The agitator 142 is therefore mounted on the rotating tubular shaft 144 and includes a plurality of spaced radial spoke members 166 and 168 respectively disposed perpendicular to each other. Rod members 170 are fixed to the spoke members 166. Rotation of the agitator assembly 142 is thereby effective to wash the coated coffee beans in conjunction with the spraying rinses issuing from the apertures 164. In order to regulate the interval during which the coffee grains are exposed to the washing action of the rinsing sprays and rotating agitator, an inlet impeller element 172 is fixed to the tubular shaft 144 adjacent to the connection of the inlet hopper 138 to the washing cylinder 140. Also, an intermediate impeller 174 is fixed to one of the agitator spoke elements 166. The granular material is thereby fed in an axial direction through the washing cylinder at a controlled rate of speed for delivery into the discharge casing 150 within which there is disposed a discharge impeller 176 fixed to the rotating tubular shaft 144. Tangentially connected to the discharge casing 150 is a washer delivery chute 178 as more clearly seen in FIGURE 11. However, the discharge casing 150 is closed off from the delivery chute 178 by means of a discharge gate biased to a closed position as illustrated in solid lines in any suitable manner, as for example, by use of a counterweight 182. Accordingly, discharge from the washer mechanism will occur in response to a predetermined pressure applied to the granular material by the impeller elements 172, 174 and 176. Proper washing of the granular material is thereby assured.

Figure 9:
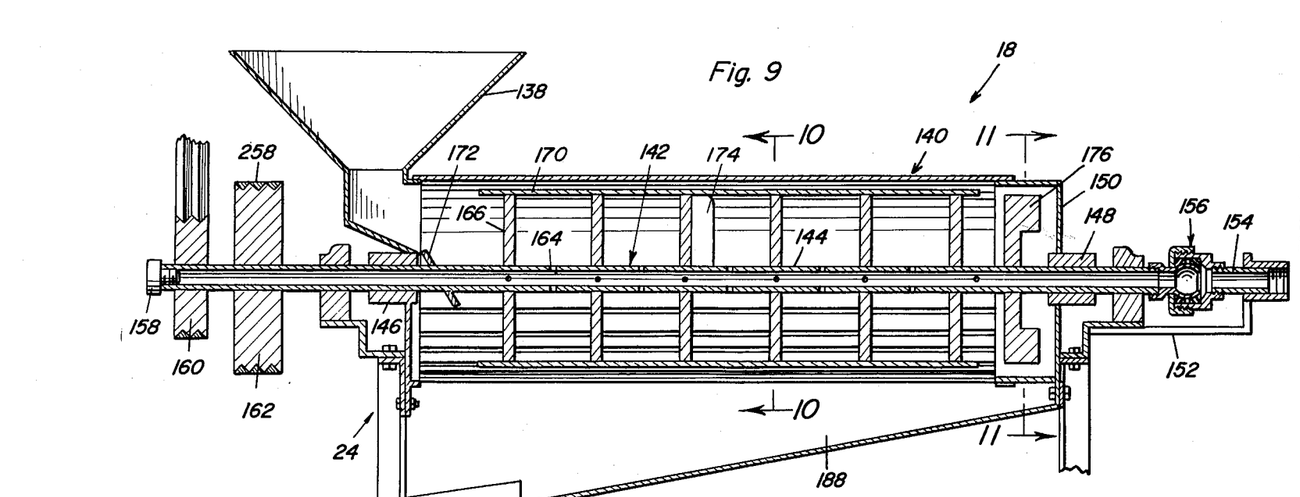
FIGURE 9 is an enlarged partial sectional view of the washer mechanism taken substantially through a plane indicated by section line 9—9 of FIGURE 3.
Figure 10:
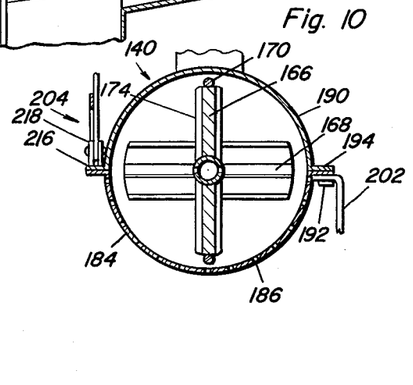
FIGURE 10 is a partial sectional view taken substantially through a plane indicated by section line 10—10 in FIGURE 9.

It will be observed from FIGURES 9, 10 and 12, that the washer cylinder 140 is composed of a bottom section 184 having a plurality of longitudinal spaced slots 186 through which the rinse water and substances washed off the coffee grains, pass downwardly into a disposal chute 188. The top portion 190 of the washer cylinder 140 is assembled onto the bottom portion 184 by interfitting of lugs 192 on flange 194 of the upper portion 190 with apertures 196 on the flange 198 of the bottom portion 184. The projecting lugs 200 on the bottom portion 184 support the bottom portion on the frame portion 24 by means of supporting bracket member 202 as more clearly seen in FIGURE 2. A lock mechanism generally referred to by reference numeral 204 is provided for the purpose of releasably securing the top portion 190 of the cylinder to the bottom portion 184. The lock mechanism 204 therefore includes a rigid link member 206 as more clearly seen in FIGURE 1 pivotally interconnecting slide lock elements 208 and 210 and connected through a pin and slot connection 212 to a lock lever 214 pivotally mounted on the flange portion 216 of the upper cylinder portion 190 by means of pivot brackets 218. The lever 214 is however also pivotally connected to ratchet element 220 having a one-way ratchet connection to ratchet element 221 pivotally connected to slide element 210 to form a second rigid link only with respect to the transmission of force from slide 210 to lever 214 to prevent relative movement. Retraction of the lock slide elements 208 and 210 from the elements 222 and the locked position shown in FIGURE 1 in order to release the cylinder halves, may therefore be effected by applying force in a clockwise direction to the lock lever 214 so as to slide elements 208 and 210 free of the retaining elements 222 on bottom portion 184 of the cylinder through link 206 since the element 220 pivotally connected to lever 214 will then ratchet over element 221. However, any tendency for the slide 210 to withdraw from the lock position shown in FIGURE 1, will be resisted because of the ratchet connection. It will of course be understood that any other suitable locking mechanism may be utilized.

Referring now to FIGURES 2, 3, 13 and 14, it will be observed that the separating mechanism 26 is detachably secured to the washer frame portion 24 and includes a screening pan 226 which is positioned at one end below the washer delivery chute 178 for receiving all of the coffee grains therefrom. The screening pan 226 is therefore provided at the bottom with spaced slats 228 defining openings therebetween through which washed coffee beans may pass. The screening pan 226 is therefore pivotally connected by means of arms 230 to lever elements 232, fixed on shaft 233 adjacent one end thereof which shaft 233 is pivotally mounted on the frame portion 24 by a removable bracket member 234. The screening pan 226 is supported closer to its discharge end 236 by an adjustably mounted roller 238 rotatably mounted at the end of a frame assembly 240. The frame assembly 240 is also pivotally supported by shaft 233 at a slight downward incline. Accordingly, an angle iron member 242 is fixed to the frame portion 24 and acts as a downward limiting stop for the screening pan support assembly 240. Fixed to the shaft 233 is a forwardly projecting arm 244 which is link connected by link 246 to elongated lever member 248 fulcrumed by a pivot bracket 250 on the frame portion 24. The lever member 248 projects rearwardly from the frame portion 24 and is connected by a connecting rod 252 to a crank disk 254 fixed to one end of the pulper shaft 50. It will therefore be apparent that upon rotation of the crank disk 254, oscillatory or reciprocatory movement will be imparted to the screening pan 226 causing it to vibrate and thereby propel the coffee grains received therewithin forwardly toward the discharge end 236. The vibratory motion imparted to the screening pan insures that the washed coffee beans of proper grain size pass through the openings defined between the slats 228. Containers may therefore be disposed beneath the screen pan for receiving the coffee beans from the bottom portion of the screening pan while separate containers may be disposed at the discharge end 236 of the screening pan for receiving the residue portion of the coffee granular material.

In order to operate all of the aforementioned components of the machine 10, the power source or electric motor 30 is drivingly connected to a transmission including the power shaft 256 having a pulley wheel connected thereto about which a power drive belt 258 is entrained. The belt 258 is also entrained about the pulley wheel 162 whereby rotation is imparted to the tubular shaft 144 of the washing mechanism 18. The pulley wheel 160 on the shaft 144 is in turn drivingly connected to the pulper shaft 50 by means of a belt 260. The belt 260 is drivingly connected to the pulper shaft 50 on that side thereof opposite the side to which the crank disk 254 is connected. A pulley wheel connected to the side of the pulper shaft 50 adjacent to the crank disk 254 has entrained thereabout an endless pulley belt 262 as more clearly seen in FIGURE 2. The pulley belt 262 is therefore also entrained about a pulley wheel 264 fixed to the feeder shaft 42. The belt 262 is rendered operative by means of a belt tensioner device 266. The belt tensioner 266 therefore includes an idler pulley wheel 268 rotatably mounted on a lever member 270, the position of which may be adjusted for adjusting the tensioning of the belt 262 by means of an adjustable screw element 272 as more clearly seen in FIGURE 4. From the foregoing description of the driving connection of the various components of the machine 10 to the driving motor 30, it will be appreciated, that the motor 30 directly drives the washer mechanism through the shaft 144 at a relatively rapid speed necessary to effect the agitating action herein before described with respect to the washing mechanism 22. A power drive is also provided from the washer shaft 144 to the pulper shaft 50 at a relatively high speed. Finally, an adjustably tensioned drive imparts rotation to the feeder shaft 42 from the pulper shaft 50 at a reasonable speed.

From the foregoing description, operation and utility of the coffee crop processing machine 10 will be apparent. Summarizing however the operation thereof, it will be recalled that all of the coffee crop materials are loaded into the inlet hopper 32 of the inlet feeding device 20 without any prior selection of coffee grains. The rotating feeder wheel 40 is therefore operative to tumble the coffee grain exposed thereto at the bottom of the restricted outlet of the hopper for passage at a controlled rate of speed past an adjustably opened gate 44 admitting only granular material below a predetermined maximum grain size. The coffee grains then pass between rotating pulper disks 52 and confining members 56 and 58 of the pulping mechanism 18. The confining members which bring the coffee grains into pressure contact with the rasping surfaces on the pulper disks, are simultaneously and yieldably spaced from the pulper disks within limits in accordance with the coffee grain size so that the rasping projections 54 on the pulper disks completely remove pulp only from ripe coffee berries to release therefrom the mucous or lubricant covered coffee beans. The coffee beans together with granular materials from which the pulp has not been removed, are received within the channel formations 62 of the confining members and are delivered to the washing mechanism 22. Accordingly, the coffee beans and unripe coffee grains are received at one axial end of a washer cylinder 140 formed from a bottom portion 184 having rinse outlet slots therein and a top portion releasably locked thereto. The coated coffee beans are therefore exposed to the washing action of a rotating agitator 142 rotatably mounted within the washer cylinder having spaced water spray apertures 164 and propeller blades 172 and 174 for axially moving the coffee grains to a delivery end of the washer cylinder. A discharge propeller 176 within the discharge casing 150 connected to the discharge end of the washer cylinder moves the washed coffee grains through a discharge gate 180, biased closed. The coffee grains are therefore finally delivered to one end of the screening pan 226 of the separator mechanism 26 which is vibrated and disposed at a slight downward incline. The bottom of the screening pan is therefore provided with openings through which only washed coffee beans may pass while the residue of the coffee grains are discharged at the remote end of the screening pan. It will be understood, of course, that the separating mechanism may be easily disconnected from the machine should its use be unnecessary when so indicated by the nature of the coffee crop harvested.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A machine for processing a coffee crop or the like comprising, crop receiving inlet means operative to controllably restrict passage to granular material below a predetermined maximum grain size, pulping means yieldably displaceable in response to reception of the granular material from the inlet means to remove casings from granular material above a predetermined minimum grain size for separation thereof into separate grain portions of a reduced size, washer means operative to receive all of said granular material from the pulping means for removal of coatings therefrom, and dimensionally responsive separating means receiving all of the granular material from the washer means and operative to separate the washed grain portions of reduced size below said predetermined minimum size from the granular material of greater size.

2. The combination of claim 1, wherein said inlet means comprises, a hopper having a restricted outlet, guide means mounted within said hopper for directing the granular material toward said restricted outlet, rotatable feeder means exposed to the granular material through said outlet, and adjustable gate means mounted in spaced relation to the feeder means to define a restricted passage communicating with said outlet to bar passage of material dimensionally exceeding said maximum grain size.

3. A machine for processing a coffee crop or the like comprising, crop receiving inlet means operative to controllably restrict passage to granular material below a predetermined maximum grain size, pulping means yieldably displaceable in response to reception of the granular material from the inlet means to remove casings from granular material above a predetermined minimum grain size for separation thereof into separate grain portions of a reduced size, washer means operative to receive all of said granular material from the pulping means for exposing said grain portions to coating removal action, and dimensionally responsive separating means receiving all of the granular material from the washer means and operative to separate the washed grain portions of reduced size from the remainder of the granular material of greater size, said inlet means comprising a hopper having a restricted outlet, guide means mounted within said hopper for directing the granular material toward said restricted outlet, rotatable feeder means exposed to the granular material through said outlet, and adjustable gate means mounted in spaced relation to the feeder means to define a restricted passage communicating with said outlet, said pulping means comprising, a plurality of rotatable pulper disks having rasping surfaces thereon, confining means movably mounted between said pulper disks, biasing means responsive to passage of granular material or maximum grain size between the pulper disks and confining means for regulating the spacing between the pulper disks and confining means to predetermine the size range of granular material from which casings are ground away and channel means formed within said confining means for receiving and delivering granular material and grain portions of a grain size below said predetermined size range and thereby limit the grinding of the granular material by the rasping surfaces on the pulper disks.

4. The combination of claim 3, wherein said washer means comprises, chamber means, an inlet connected to one axial end of the chamber means for receiving granular material from the pulping means, agitating rotor means rotatably mounted within the chamber means, rinsing means mounted in the rotor means, impeller means mounted on the rotor means for axially impelling the granular material to the other axial end of the chamber means, rinse and coating disposal means connected to a bottom portion of the chamber means, and biased discharge gate means connected to said other axial end of the chamber means for delivering granular material subjected to the washing action of the agitating rotor means and rinsing means in response to a predetermined pressure applied thereto by the impeller means.

5. The combination of claim 4, wherein said dimensionally responsive separating means comprises, movably mounted screening means having openings therein through which said grain portions with coatings removed may pass and vibratory drive means operatively connected to the screening means for propelling the granular material therealong for residue discharge at a delivery end.

6. The combination of claim 5 including power drive means drivingly connecting the washer means and pulping means, releasably drive means drivingly connecting the pulping means to the inlet feed means to regulate the rate of feed thereto and disconnectable linkage means operatively connecting the pulping means to the separating means.

7. The combination of claim 6, wherein said granular material includes ripe and unripe coffee berries, said casings comprising pulp while said grain portions constitute coffee beans coated by a lubricating substance prior to washing.

8. A machine for processing a coffee crop or the like comprising, crop receiving inlet means operative to controllably restrict passage to granular material below a predetermined maximum grain size, pulping means yieldably displaceable in response to reception of the granular material from the inlet means to remove casings from granular material above a predetermined size range for separation thereof into separate grain portions of a reduced size, washer means operative to receive all of said granular material from the pulping means for exposing said grain portions to coating removal action, and dimensionally responsive separating means receiving all of the granular material from the washer means and operative to separate the washed grain portions of reduced size from the remainder of the granular material of greater size, said pulping means comprising, a plurality of rotatable pulper disks having rasping surfaces thereon, confining means movably mounted between said pulper disks, biasing means responsive to passage of granular material of maximum grain size between the pulper disks and confining means for regulating the spacing between the pulper disks and confining means to predetermine the size range of granular material from which casings are ground away and channel means formed within said confining means for receiving and delivering granular material and grain portions of a grain size below said predetermined size range and thereby limit the grinding of the granular material by the rasping surfaces on the pulper disks.

9. The combination of claim 1, wherein said washer means comprises, chamber means, an inlet connected to one axial end of the chamber means for receiving granular material from the pulping means, agitating rotor means rotatably mounted within the chamber means, rinsing means mounted in the rotor means, impeller means mounted on the rotor means for axially impelling the granular material to the other axial end of the chamber means, rinse and coating disposal means connected to a bottom portion of the chamber means, and biased discharge gate means connected to said other axial end of the chamber means for delivering granular material subjected to the washing action of the agitating rotor means and rinsing means in response to a predetermined pressure applied thereto by the impeller means.

10. The combination of claim 1, wherein said dimensionally responsive separating means comprises, movably mounted screening means having openings therein through which said grain portions with coatings removed may pass and vibratory drive means operatively connected to the screening means for propelling the granular material therealong for residue discharge at a delivery end.

11. The combination of claim 1 including power drive means drivingly connecting the washer means and pulping means, releasably drive means drivingly connecting the pulping means to the inlet feed means to regulate the rate of feed thereto and disconnectable linkage means operatively connecting the pulping means to the separating means.

12. The combination of claim 1, wherein said granular material includes ripe and unripe coffee berries, said casings comprising pulp while said grain portions constitute coffee beans coated by a lubricating substance prior to washing.

13. A pulper device for a coffee crop processing machine comprising a plurality of rotatable pulper disks having rasping surfaces thereon, confining means movably mounted between said pulper disks, biasing means responsive to passage of granular material of maximum grain size between the pulper disks and confining means for regulating the spacing between the pulper disks and confining means to predetermine the size and range of granular material from which casings are ground away and channel means formed within said confining means for receiving and delivering granular material and grain portions of a grain size below said predetermined size range and thereby limit the grinding of the granular material by the rasping surfaces on the pulper disks.

14. A machine for processing a coffee crop or the like comprising, a crop receiving inlet means operative to controllably restrict passage to granular material below a predetermined maximum grain size, and pulping means yieldably displaceable in response to reception of the granular material from the feed means to remove casings from only granular material above a predetermined minimum grain size for separation thereof into separate grain portions of a reduced size.

15. The combination of claim 14, wherein said inlet means comprises, a hopper having a restricted outlet, guide means mounted within said hopper for directing the granular material toward said restricted outlet, rotatable feeder means exposed to the granular material through said outlet, and adjustable gate means mounted in spaced relation to the feeder means to define a restricted passage communicating with said outlet to bar passage of material dimensionally exceeding said maximum grain size.

16. A machine for processing a coffee crop or the like comprising, crop receiving inlet means operative to controllably restrict passage to granular material below a predetermined maximum grain size, pulping means yieldably displaceable in response to reception of the granular material from the feed means to remove casings from granular material within a predetermined size range for separation thereof into separate grain portions of a reduced size, and washer means operative to receive all of said granular material from the pulping means for exposing said grain portions to coating removal action, said pulping means comprising, a plurality of rotatable pulper disks having rasping surfaces thereon, confining means movably mounted between said pulper disks, biasing means responsive to passage of granular material of maximum grain size between the pulper disks and confining means for regulating the spacing between the pulper disks and confining means to predetermine the size range of granular material from which casings are ground away and channel means formed within said confining means for receiving and delivering granular material and grain portions of a grain size below said predetermined size range and thereby limit the grinding of granular material by the rasping surfaces on the pulper disks.

17. The combination of claim 16, wherein said washer means comprises, chamber means, an inlet connected to one axial end of the chamber means for receiving granular material from the pulping means, agitating rotor means rotatably mounted within the chamber means, rinsing means mounted in the rotor means, impeller means mounted in the rotor means for axially impelling the granular material to the other axial end of the chamber means, rinse and coating discharge means connected to a bottom portion of the chamber, and biased discharge gate means connected to said other axial end of the chamber means for delivering granular material subjected to the washing action of the agitating rotor means and rinsing means in response to a predetermined pressure applied thereto by the impeller means.

18. A machine for processing a coffee crop or the like comprising, crop receiving inlet means operative to controllably restrict passage to granular material below a predetermined maximum grain size, pulping means yieldably displaceable in response to reception of the granular material from the feed means to remove casings from granular material within a predetermined size range for separation thereof into separate grain portions of a reduced size, and washer means operative to receive all of said granular material from the pulping means for exposing said grain portions to coating removal action, said pulping means comprising, a plurality of rotatable pulper disks having rasping surfaces thereon, confining means movably mounted between said pulper disks, biasing means responsive to passage of granular material of maximum grain size between the pulper disks and confining means for regulating the spacing between the pulper disks and confining means to predetermine the size range of granular material from which casings are ground away and channel means formed within said confining means for receiving and delivering granular material and grain portions of a grain size below said predetermined size range and thereby limit the grinding of granular material by the rasping surfaces on the pulper disks.

19. A machine for processing grains having outer shells enclosing coated beans, comprising, restrictive feeding means for passing grains below a predetermined maximum grain size, hulling means responsive to reception of said grains from said restrictive feeding means for removal of the outer shells of only those grains above a predetermined minimum size to expose the coated beans enclosed therein, means for removing the coatings from the beans exposed by the hulling means and selecting means for separating said beans from the unshelled grains below said predetermined minimum size.

References Cited in the file of this patent

UNITED STATES PATENTS

| | | |
|---|---|---|
| 568,144 | Perez | Sept. 22, 1896 |
| 629,547 | Couch | July 25, 1899 |
| 766,539 | Smith | Aug. 2, 1904 |
| 880,359 | Collins | Feb. 25, 1908 |
| 1,013,807 | Okrassa | Jan. 2, 1912 |
| 1,219,079 | Carreras | Mar. 13, 1917 |
| 1,611,255 | Sturtevant | Dec. 21, 1926 |
| 2,088,846 | Douglass | Aug. 3, 1937 |
| 2,696,821 | Streets | Dec. 14, 1954 |
| 2,833,392 | Meissner | May 6, 1958 |

FOREIGN PATENTS

| | | |
|---|---|---|
| 203,141 | Great Britain | Sept. 6, 1923 |